United States Patent [19]

Matsuo et al.

[11] Patent Number: 4,983,335

[45] Date of Patent: Jan. 8, 1991

[54] METHOD FOR PRODUCING TRANSPARENT PLASTIC ARTICLE

[75] Inventors: Takahiro Matsuo; Takao Inoue, both of Hirakata, Japan

[73] Assignee: Matsushita Electrical Industrial Co., Ltd., Osaka, Japan

[21] Appl. No.: 291,352

[22] Filed: Dec. 29, 1988

Related U.S. Application Data

[63] Continuation of Ser. No. 938,981, Dec. 3, 1986, abandoned.

[30] Foreign Application Priority Data

Dec. 3, 1985 [JP] Japan .................. 60-271851
Dec. 17, 1985 [JP] Japan .................. 60-283444
Feb. 17, 1986 [JP] Japan .................. 61-32311
Mar. 14, 1986 [JP] Japan .................. 61-57216

[51] Int. Cl.$^5$ .................. B29C 35/08; B29D 11/00
[52] U.S. Cl. .................. 264/25; 264/1.4; 264/22
[58] Field of Search .................. 264/1.4, 2.1, 2.2, 313, 264/2.6, 22, 25; 425/174.4, 808

[56] References Cited

U.S. PATENT DOCUMENTS

| | | | |
|---|---|---|---|
| 2,687,555 | 8/1954 | Anspon et al. | 264/313 |
| 3,699,089 | 10/1972 | Wichterle | 264/2.1 |
| 4,113,224 | 9/1978 | Clark et al. | 264/1.4 |
| 4,123,407 | 10/1978 | Gordon | 264/2.6 |
| 4,497,754 | 2/1985 | Padoan | 264/1.4 |
| 4,701,288 | 10/1987 | Cook et al. | 264/25 |
| 4,702,574 | 10/1987 | Bawa | 264/1.4 |
| 4,732,715 | 3/1988 | Bawa et al. | 264/1.4 |

FOREIGN PATENT DOCUMENTS

| | | | |
|---|---|---|---|
| 132221 | 10/1980 | Japan | 264/1.4 |
| 71830 | 4/1984 | Japan | 264/1.4 |

Primary Examiner—James Lowe
Attorney, Agent, or Firm—Wenderoth, Lind & Ponack

[57] ABSTRACT

A transparent plastic article with less internal strain is produced by successively polymerizing a monomer part by part with forming a gel state part between the already polymerized part and the unpolymerized part, or by polymerizing a monomer by means of a mold which can follow cure shrinkage of the monomer in order to decrease cure shrinkage. The article produced is particularly suitable for optical applications such as an optical disc, a lens and a prism.

3 Claims, 9 Drawing Sheets

METHOD FOR PRODUCING TRANSPARENT PLASTIC ARTICLE

This application is a continuation of now abandoned application Ser. No. 06/938,981, filed Dec. 3, 1986.

BACKGROUND OF THE INVENTION

1. Field of the Invention

The present invention relates to a method for producing a transparent plastic article, particularly an optical plastic article such as an optical disc as an information recording medium, a lens and a prism by low strain polymerization of a polymerizable liquid monomer.

2. Description of the Prior Arts

A substrate for an optical disc is made of an optically polished glass plate or an injection moldable resin such as a polycarbonate resin (hereinafter referred to as "PC") and polymethyl methacrylate (hereinafter referred to as "PMMA") and, for some kinds of the optical discs, the substrate is made of casting PMMA. The plastic lens is made of not only the injection moldable resin such as PC and PMMA but also a thermosetting resin such as an aryl resin, an epoxy resin and CR-39 (Trade mark of UCC).

The conventional substrates for the optical disc have some drawbacks. Since the optically polished glass plate should be made by cutting a glass plate into a predetermined size piece, optically polishing it and then forming a recording groove, it cannot fulfill the current commercial needs for production cost and production tact.

Although the plastic substrate made by injection molding of the thermoplastic resin has no significant problem in production cost and production tact, it has comparatively poor optical characteristics due to burning during molding, the presence of foreign particles in the raw material and birefringence or warp caused by molding strain or shrinkage. Thereby, it has great disadvantages in recording density and recording/reproducing capability. In addition, when the plastic substrate for the optical disc makes use of reflectance change caused by phase transition of a recording layer, it is required to have heat resistance up to around 200° C. The plastic substrate for a photo-electro-magnetic disc, it is required to have optical uniformity showing small optical strain such as uniform birefringence. Since the thermoplastic resin does not satisfy such requirements, a thermosetting resin has been used. However, the thermosetting resin has a unsatisfactorily low curing rate. Although an ultraviolet curing resin is cured at a high rate, a highly heat resistant one suffers from large curing shrinkage. Therefore, unless the cure shrinkage is reduced, a surface of the article tends to have flow marks caused by reaction shrinkage and mold releasing and/or by the unreacted monomer which flows onto the shrunk surface having been released from a mold surface due to distribution of reaction rates in the mold, or the substrate tends to crack.

In a method for producing an optical disc wherein photopolymerization of a polymer is effected under such condition that grooves or signals are present on a surface of a stamper or a glass mold, strain in the disc substrate increases so that a value of birefringence unsatisfactorily increases.

In the production of the optical articles such as the optical disc and the plastic optical lens or prism, since the raw material can be filtered, the foreign particle in the raw material cause no problem. However, their productivity is still to be improved since it takes several ten hours for polymerization and the unreacted monomers scatter during metallizing or spattering of a recording layer or an anti-reflection layer.

SUMMARY OF THE INVENTION

One object of the present invention is to provide an improved method for producing a transparent plastic article particularly useful for optical use.

Another object of the present invention is to provide a method for producing a transparent plastic article having less foreign particles.

Further object of the present invention is to provide a method for producing a transparent plastic article having less molding strain and in turn less birefringence.

A yet another object of the present invention is to provide a method for producing a transparent plastic article a surface of which has less flow marks.

BRIEF DESCRIPTION OF THE DRAWINGS

FIG. 9 is a front view of a plastic disc plate produced in Examples 1 to 4, FIGS. 10A and 10B schematically show one embodiment of an apparatus for use in practicing the second method for producing a transparent plastic article according to the present invention, FIG. 11 schematically shows another embodiment of an apparatus for use in practicing the second method according to the present invention, FIG. 12 schematically shows states of the monomer composition being polymerized by means of the apparatus of FIG. 10, FIG. 13 schematically shows a further embodiment of an apparatus for use in practicing the second method according to the present invention, FIGS. 14A and 14B schematically shows a yet another apparatus for use in practicing the second method according to the present invention.

DETAILED DESCRIPTION OF THE INVENTION

According to the first aspect of the present invention, there is provided a method for producing a transparent plastic article, which comprises steps of
  (1) charging a photopolymerizable liquid monomer into a mold transparent to ultraviolet light,
  (2) irradiating a part of the monomer with ultraviolet light to form a polymerized resin part, a gel state part comprising the unreacted monomer and the polymerized resin and a part of the unreacted monomer,
  (3) flowing the gel and/or the unreacted monomer into a cavity formed in the mold by cure shrinkage of the monomer,
  (4) irradiating a wider area than the polymerized part in the previous irradiation step, and
  (5) repeating the steps (3) and (4) till the polymerized area reaches the predetermined size.

In the context of the present specification, the "polymerized part" is intended to mean a part through which ultraviolet light is transmitted and the monomer is polymerized to cure. The "gel state part" is formed near an interface between the part which ultraviolet light reaches and the part which ultraviolet light does not reach wherein polymerization initiating species generated by ultraviolet light migrate into the monomer to polymerize it so as to form a gel-like mixture of the polymer and the unreacted monomer.

In this method, the illumination of ultraviolet light is usually from 10 to 150 mW/cm$^2$, preferably from 30 to 100 mW/cm$^2$.

The area of the part of the monomer which is cured in each irradiation step can be easily determined according to other conditions such as the composition of the monomer composition, the kind of the monomer to be polymerized, a thickness of the article and the like. Usually, the width of the polymerized part in each irradiation step is increased by 1 mm to 10 mm, preferably by 2 mm to 5 mm.

When the area in which the monomer is polymerized in the previous step is again irradiated by ultraviolet light in the subsequent irradiation step, the final product may be unevenly cured or the polymer in that part may be decomposed. To prevent such drawbacks, the subsequent irradiation may be carried out with masking the part already cured in the previous irradiation step. Thereby, any part of the monomer can be irradiated by substantially the same illumination so that the final product has less internal cure strain therein.

Since the polymerizable liquid monomer has a good image-transfer property, any minute pattern such as a recording groove can be formed on one surface of the cured article simultaneously with the polymerization of the monomer when a stamper is provided on one wall of the mold.

In addition, since the raw material is the liquid monomer, it can be purified by filtration or distillation before polymerization whereby contamination of the molded article with the foreign particles which cause problems in the injection molding is prevented. In comparison with the injection molding, the molded article produced by this method contains only one hundredth to one thousandth of the foreign particles. Therefore, the molded article according to the present invention can reduce recording errors due to the foreign particles so that it can increase the recording capacity.

According to the above method according to the first aspect of the present invention, since the gel-state part is formed between the polymerized part and the unreacted monomer part, the molded article has greatly decreased cure strain which results in crack or warp of the produced article and improved size accuracy and optical characteristics (for example, less birefringence and foreign particles). With respect to the size accuracy, although the volume of the monomer decreases due to curing, the gel and/or the unreacted monomer flow into a space formed by such shrinkage so as to prevent the formation of a gap between the monomer being cured and the already cured part. Such gap is often found in the conventional molding of thermoplastic resin, thermosetting resin or photopolymerizable resin. Thereby, the molded article having the same size accuracy as that of the mold can be produced. With respect to birefringence of the article, since the entire article is uniformly cured, the article has not more than 10 nm of birefringence at a single pass thickness of 1 mm, while the conventional polycarbonate article has 20 to 40 nm of birefringence.

Since the monomer is polymerized in a cold mold, burning of the resin as is found in the molding of a thermoplastic resin or generation of metal powder due to chipping of a screw are prevented so that contamination of foreign particles having a particle size of 0.5 to 1 $\mu$m or more is prevented. As a result, an error rate of the disc substrate can be reduced to $10^{-6}$ to $10^{-9}$ and, in turn, a preliminary recording area formed in the conventional recording disc can be used as an actual recording area, which leads to increase of recording capacity of the disc.

Although the same effects may be achieved with the thermosetting resin such as epoxy resin, in thermosetting, the mold is wholly heated due to heat conduction even when only a part of the mold is heated so that the polymerization proceeds with a temperature gradient in the mold and the monomer is not uniformly polymerized. This leads to cracking of the article during molding or ununiformity of birefringence. To prevent these drawbacks in the molding of the thermosetting resin, the mold should be partially heated or cooled and its temperature should be precisely controlled, which requires a mold much larger than one used in photopolymerization with ultraviolet light. Further, the thermosetting requires several ten minutes to several hours while the ultraviolet polymerization can be completed within several seconds to several ten minutes.

According to the second aspect of the present invention, there is provided a method for producing a transparent plastic article, which comprises steps of
  (i) charging a photopolymerizable liquid monomer into a mold transparent to ultraviolet light,
  (ii) irradiating the mold containing the monomer with ultraviolet light to form a polymerized resin layer, a gel state layer comprising the unreacted monomer and the polymerized resin and a layer of the unreacted monomer,
  (iii) flowing the gel and/or the unreacted monomer into a cavity formed in the mold by cure shrinkage of the monomer,
  (iv) irradiating the mold containing the partially polymerized monomer with ultraviolet light at an illumination larger than that in the previous irradiation step, and
  (v) repeating the steps of (iii) and (iv) till the whole monomer is polymerized.

To increase the illumination of ultraviolet light, several manners are contemplated. For example, in the subsequent irradiation step, the ultraviolet light is irradiated from a shorter distance than in the previous irradiation step. In another manner, several extinction plates are provided between the mold and the ultraviolet light source in the first irradiation step and the subsequent irradiation steps are carried out by removing the extinction plates one by one.

In the first irradiation step, the illumination of ultraviolet light is usually from 10 to 30 mW/cm$^2$, preferably from 15 to 25 mW/cm$^2$. In each subsequent irradiation step, the illumination of ultraviolet is increased by 70 to 150 mW/cm$^2$, preferably by 80 to 120 mW/cm$^2$.

According to the third aspect of the present invention, there is provided a method for producing a transparent plastic article, which comprises steps of charging a photopolymerizable liquid monomer into a mold at least opposite two walls of which are transparent to ultraviolet light, irradiating the monomer through both of said transparent walls with ultraviolet light to precure the monomer at such an illumination that the monomer is not completely cured, removing the precured article from the mold, and post-curing the precured article.

By this method, the formation of flow marks due to curing shrinkage and/or to decrease birefringence due to curing shrinkage are effectively prevented.

In the above method, the illumination of ultraviolet light varies with the kind of the monomer(s) to be polymerized. Usually, it is from 10 to 150 mW/cm$^2$, preferably from 30 to 100 mW/cm$^2$.

The precured polymer may be post-cured by the application of ultraviolet light, heat or electron beam, or a combination thereof. When ultraviolet light is used, it is irradiated in 4,000 to 20,000 mJ/cm$^2$. When heat is used, temperature is from 80° to 260° C., preferebly from 150° to 250° C. When electron beam is used, its energy is up to 750 KeV or 10 Mrad.

When the post-curing is thermally effected, it is preferably carried out in an inert gas atmosphere such as nitrogen.

In the above method, since the article is removed from the mold in the precured state, crack or warp induced by unbalance of the adherence force with the mold surface can be prevented. Since the precured article is post cured from both side, the both surfaces of the article uniformly shrink so that the article with less internal strain is produced, and any crack is not caused on the article surfaces.

In the present invention, the polymerizable liquid monomer may comprise a monomer which is liquid at room temperature or a mixture of monomers which is liquid at room temperature. According to the present invention, any photopolymerizable monomer may be used although its polymerization rate varies.

As the polymerizable liquid monomer, preferably used is a composition of polyfunctional (meth)acrylate and a thermal polymerization initiator and/or a photosensitizer. A preferred example of polyfunctional (meth)acrylate is a compound of the formula:

wherein R$_1$ is a residue derived from a C$_1$–C$_{50}$ alcohol, R$_2$ is a hydrogen atom or a methyl group, and n is an integer of 2 to 6 a radically polymerized homopolymer of which has a glass transition temperature not lower than 110° C.

Specific examples of the polyfunctional (meth)acrylate (I) are 2,2'-bis[4-(β-methacryloyloxy)cyclohexyl]-propane, 2,2'-bis[4-(β-methacryloyloxydiethoxy)cyclohexyl]-propane, bis(oxymethyl)tricyclo[5.2.1.0$^{2,6}$]-decane di(meth)acrylate, 1,4-bis(methacryloyloxymethyl)cyclohexane, trimethylolpropane tri(meth)acrylate, neopentyl glycol di(meth)acrylate, 1,6-hexanediol di(meth)acrylate, 1,3-butanediol di(meth)acrylate, diethylene glycol di(meth)acrylate, 2,2'-bis[4-(methacryloyldiethoxy)phenylpropane, Bisphenol A di(meth)acrylate and mixtures thereof. Among them, 2,2'-bis[4-β-methacryloyloxyethoxy)cyclohexyl]propane, bis(oxymethyl)tricyclo[5.2.1.0$^{2,6}$]decane di(meth)acrylate and 1,4-bis(methacryloyloxymethyl)cyclohexane are most preferred in view of the optical properties.

The (meth)acrylate (I) may contain a radically polymerizable monomer which is generally used as a viscosity modifier. Examples of such additional monomer are vinyl compounds (e.g., styrene, chlorostyrene, dichlorostyrene, vinyltoluene, divinyltoluene, vinyl acetate, vinyl chloride and the like), (meth)acrylates (e.g., methyl methacrylate, phenyl (meth)acrylate, benzyl (meth)acrylate, 2-phenoxyethyl (meth)acrylate, cyclohexyl (meth)acrylate, glycidyl (meth)acrylate, epoxy (meth)acrylate, urethane (meth)acrylate and the like) and acrylic compounds (e.g., diethylene glycol bisallylcarbonate, diallyl phthalate and the like).

For polymerizing the monomer(s), any radical polymerization initiator can be used. Examples of the radical polymerization initiator are peroxy compounds (e.g., benzoyl peroxide, diisopropyl peroxycarbonate, lauroyl peroxide, t-butyl peroxypivalate and the like), azo compounds (e.g., azoisobutyronitrile and the like), photosensitizers (e.g., benzophenone, benzoin ethyl ether, dibenzoyl, acetophenone, anthraquinone and the like) and sulfur containing compounds (e.g., diphenyl sulfite, thiocarbamate and the like) as well as mixtures thereof. The radial initiator may be used in an amount of 0.1 to 10 % by weight based on the weight of the monomer.

The present invention further relates to a method for producing a thin plastic plate with low strain by polymerizing a liquid monomer by the application of heat or ultraviolet light, which comprises steps of charging a monomer in a cavity of a mold having a spacer which shrinks in such a manner that it can follow polymerization shrinkage of the monomer being polymerized, applying heat or ultraviolet light to polymerize the monomer to such extent that the polymerized monomer is hard enough to be removed from the mold and then further applying heat or ultraviolet light to completely polymerize the monomer to obtain a plastic plate.

The thickness of the plastic plate to be produced by the above method is usually from 0.5 to 5 mm, preferably from 1 to 3 mm.

In this method, illumination of ultraviolet light may be the same as in the above methods of the present invention. When heat is applied, temperature also depends on the kind of the monomer(s) and usually from 80° to 150° C., preferably from 80° to 120° C. A polymerization time is usually from 30 to 70 minutes, preferably from 45 to 60 minutes.

Examples of the thermally polymerizable monomer are bis(oxymethyl)tricyclo[5.2.1.0$^{2,6}$]decane di(methacrylate) and the like.

The spacer is preferably made of a flexible rubber or resin, particularly one having Shore A hardness of 70 or less.

The volume of the photopolymerizable liquid polymer decreases as the polymerization proceeds (polymerization or cure shrinkage). Although a degree of the cure shrinkage is large in a direction across the thickness, the application of the spacer can prevent partial peeling off of the polymer from a inner surface of the mold and movement of the unpolymerized monomer into a space formed by the shrinkage of the monomer, whereby formation of flow mark is prevented. Since the plate in a partially polymerized (precure) state is removed from the mold and thereafter completely cured (post cure), the produced plate such as a disc substrate has less strain so that it has low birefringence. In this method, a mold having a metal stamper on its one wall can be used.

PREFERRED EMBODIMENTS OF THE INVENTION

Practically and presently preferred embodiments of the present invention will be illustrated in the following examples.

Example 1

Figure 1:
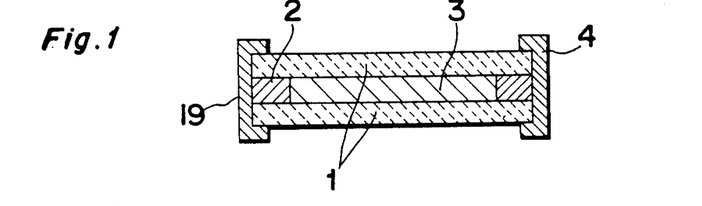
FIGS. 1 and 2 schematically show respectively a cross sectional view and a front view of a mold for use in practicing the first method for producing a transparent plastic article according to the present invention.
Figure 2:
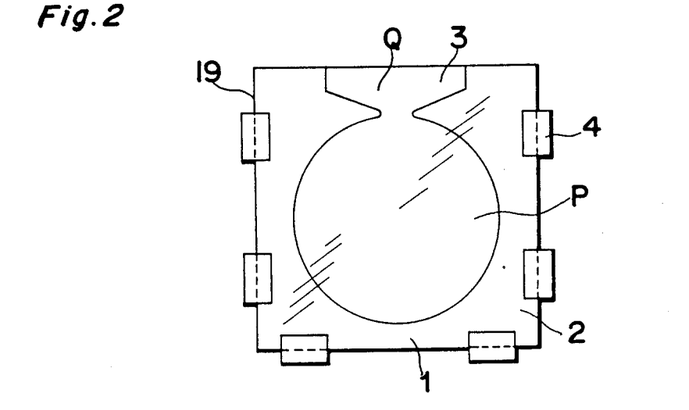

A mold used in this example for producing a disc substrate is schematically shown in FIGS. 1 and 2. The mold 19 comprises a pair of quartz glass plates 1 which are held together by means of closing clamps 4 through a spacer 2 which is made of a fluororesin having a predetermined thickness. The photopolymerizable liquid monomer composition 3 is charged into a cavity of the mold 19. In FIG. 2, "P" stands for a space in which the disc substrate is formed and "Q" stands for a space for charging the monomer composition into the space P.

Figure 3:
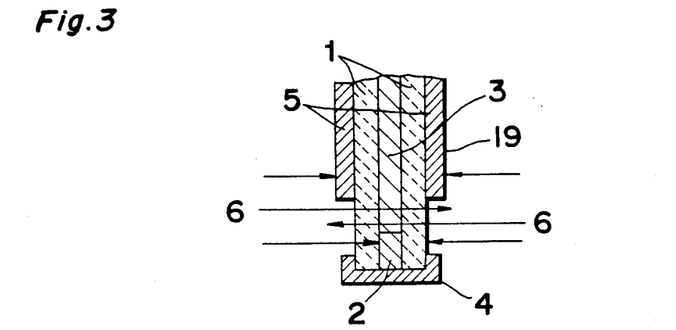
FIG. 3 is a partial cross sectional view of the mold of FIGS. 1 and 2 provided with a pair of shielding plates.
Figure 4:
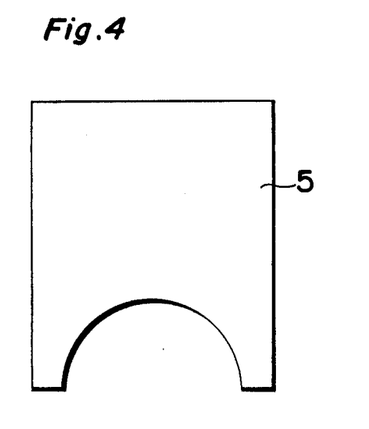
FIG. 4 is a front view of a shielding plate.
Figure 5:
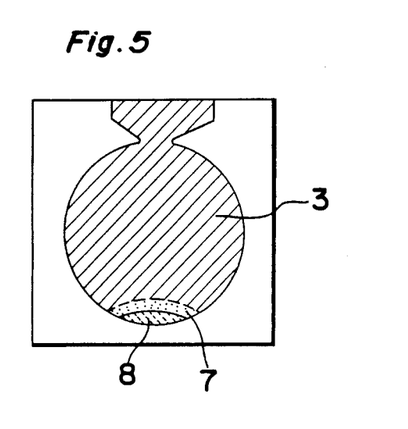
FIG. 5 is a front view of the mold in which a part of a monomer composition is cured.

Then, as shown in FIG. 3, the most part of the space P of the mold containing the monomer composition is covered by a shielding plate 5 shown in FIG. 4, and the unshielded part of the space P is irradiated by ultraviolet light 6 from a direction vertical to the plane of the quartz glass plate 1 to polymerize the monomer composition in the unshielded part of the space P. Thereby, as shown in FIG. 5, there are formed a region of the unreacted monomer composition 3, a region of gel 7 and a cured region 8 in the space P.

Thereafter, the shielding plate 5 is gradually moved to widen the area of the unshielding part and the above irradiation procedure is repeated to increase the cured region 8. These procedures are repeated till all the monomer in the space P is cured to produce a cured product having a shape of the space P. Finally, the monomer composition in the space Q is cured by the irradiation of ultraviolet light.

In Example 1, the monomer composition contained, as a bifunctional di(meth)acrylate, Bisphenol A diacrylate (BP4EA, a trade name of Kyoeisha Yushi Kagaku Kogyo Kabushikikaisha): as a trifunctional acrylate, trimethylolpropane triacrylate (TMPTA): as an epoxy methacrylate, 3002 M (manufactured by Kyoeisha Yushi Kagaku Kogyo): and as a monofunctional methacrylate, methyl methacrylate (MMA). As the polymerization initiator, IRAGACURE 184 (Trade mark, Ciba-Geigy. Active ingredient: 1-hydroxycyclohexyl phenyl ketone) was used since it causes less yellowing of the polymer and does not deteriorate transparency of the polymer, although almost all the commercially available polymerization initiator can be used. Amounts of these components were as follows:

| Component | Parts by Weight |
|---|---|
| BP4EA | 40 |
| TMPTA | 20 |
| 3002 M | 30 |
| MMA | 10 |
| IRGACURE 184 | 2 |

A thickness and a diameter of the produced disc were 1.2 mm and 13 cm, respectively.

Example 2

Figure 6:
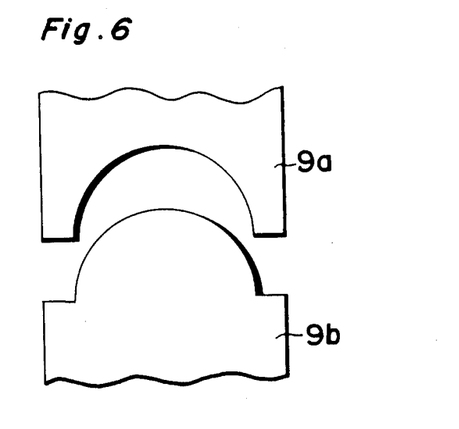
FIG. 6 is a partial front view of a pair of the shielding plates.

In substantially the same manner as in Example 1 except that a pair of upper and lower shielding plates 9a and 9b as shown in FIG. 6 were used in place of the shielding plate 5, a plastic disc substrate was produced.

One of the shielding plates 9a acted as the shielding plate 5 used in Example 1 and the other 9b prevented excess irradiation of the cured material.

Example 3

Figure 7:
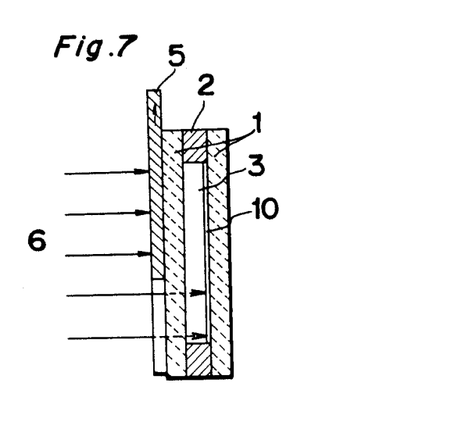
FIG. 7 is a cross sectional view of a mold having a stamper.

In the same manner as in Example 1 but providing a stamper 10 on an inner surface of either one of the quartz glass plates 1 so as to transfer a recording groove on the molded substrate, a plastic disc substrate was produced.

Example 4

Figure 8:
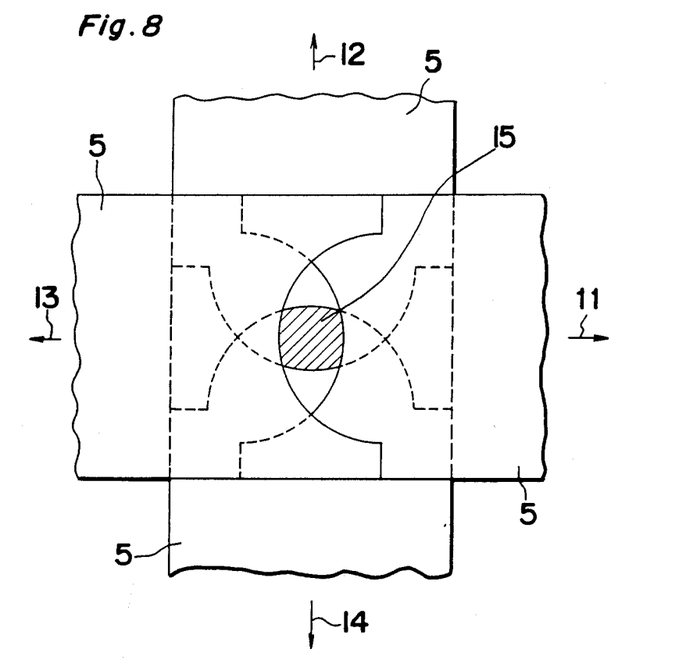
FIG. 8 is a front view of four shielding plates.

In the same manner as in Example 1 but using four shielding plates 5 as shown in FIG. 8 and moving them in four directions of arrows 11, 12, 13 and 14 to form a window 15 through which ultraviolet light passed, a plastic disc substrate was produced.

In Examples 1 to 4, as an ultraviolet light source, an extra-high pressure mercury lamp (Jet Light JL-3300 manufactured by Oak Seisakusho. 3 KW) was used to irradiate ultraviolet light at 50 mW/cm$^2$.

Figure 9:
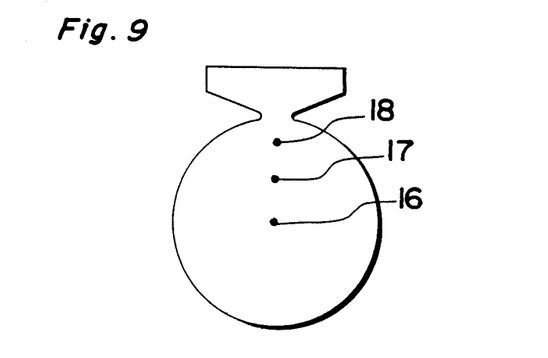

Birefringence of the produced substrate was measured at a central part 16, a middle part 17 and a peripheral part 18 near a gate of the produced disc substrate as shown in FIG. 9 by means of a polarization microscope (OPTIPHOT-POL manufactured by Nippon Kogaku) with magnification of 200 times. A shrinkage factor of the substrate with respect to the mold size at the periphery of the substrate was calculated.

The results are shown in Table 1.

TABLE 1

| Example No | Birefringence (nm)[1] | | | | Shrinkage factor (%) |
|---|---|---|---|---|---|
| | Center | Middle | Periphery | Average | |
| 1 | 1.5 | 2.1 | 4.3 | 2.6 | 0.5 |
| 2 | 1.2 | 1.7 | 3.9 | 2.3 | 0.3 |
| 3 | 3.2 | 4.8 | 5.5 | 4.5 | 0.3 |
| 4 | 3.4 | 5.7 | 6.6 | 5.2 | 0.8 |

Note: [1]Thickness of 1 mm. Single pass.

Example 5

Figure 10A:
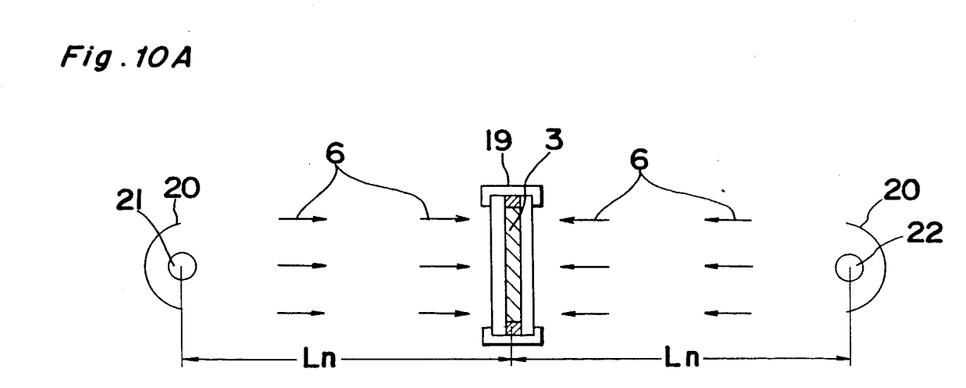
Figure 10B:
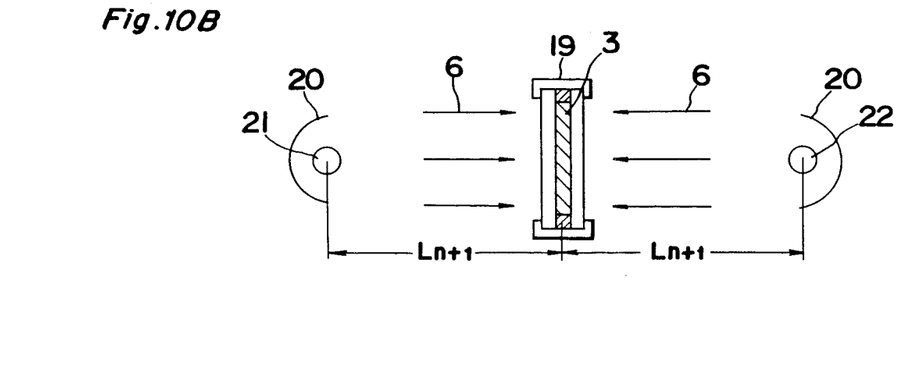

In this example, an apparatus as shown in FIGS. 10A and 10B was used. In this apparatus, the mold 19 was substantially the same as used in Example 1 except that any shielding plate was not provided with, and a pair of ultraviolet lamps 21, 22 each having a reflection mirror 20 to produce parallel rays 6 were used.

The photopolymerizable monomer composition 3 in the mold 19 was irradiated by ultraviolet light from a distance of $L_n$ and then from a distance of $L_{n+1}$ wherein $L_{n+1}$ was always shorter than $L_n$ so as to increase illuminance of ultraviolet light.

If ultraviolet light is irradiated form one side of the mold, the produced polymer article, particularly a plate tends to deform, for example, warp. Therefore, it is preferred to use a pair of the lamp arranged symmetrically with respect to the mold.

Figure 11:
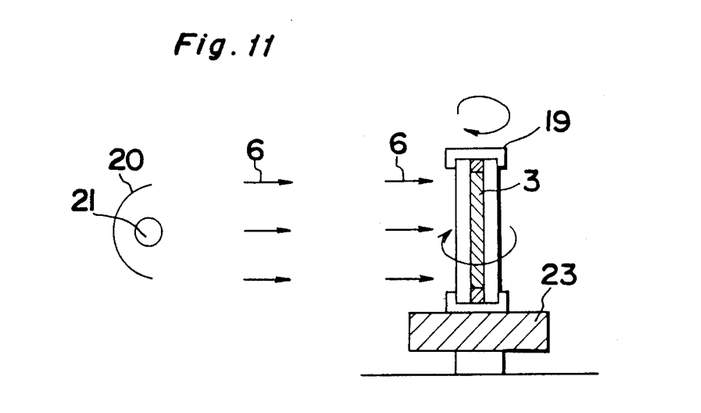

When only one ultraviolet light source is used, the mold is preferably mounted on a rotating plate 23 and rotated at an adequate revolution rate as shown in FIG. 11.

Figure 12:
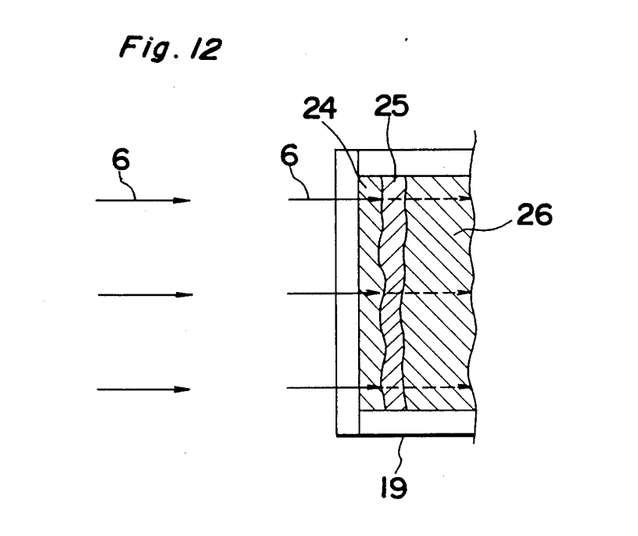

After the monomer composition 3 was irradiated from the distance of $L_n$, a surface layer 24 of the composition was cured and a deeper portion 26 of the composition remained uncured. Between the cured layer 24 and the uncured portion 26, a gel layer 25 was formed. When the monomer composition was irradiated from a shorter distance of $L_{n+1}$, illumination increased so that ultraviolet light reached to a more deeper layer whereby the thickness of the cured layer 24 increased. By repeating these procedures, the entire monomer composition was cured to form a transparent plastic article.

Example 6

Figure 13:
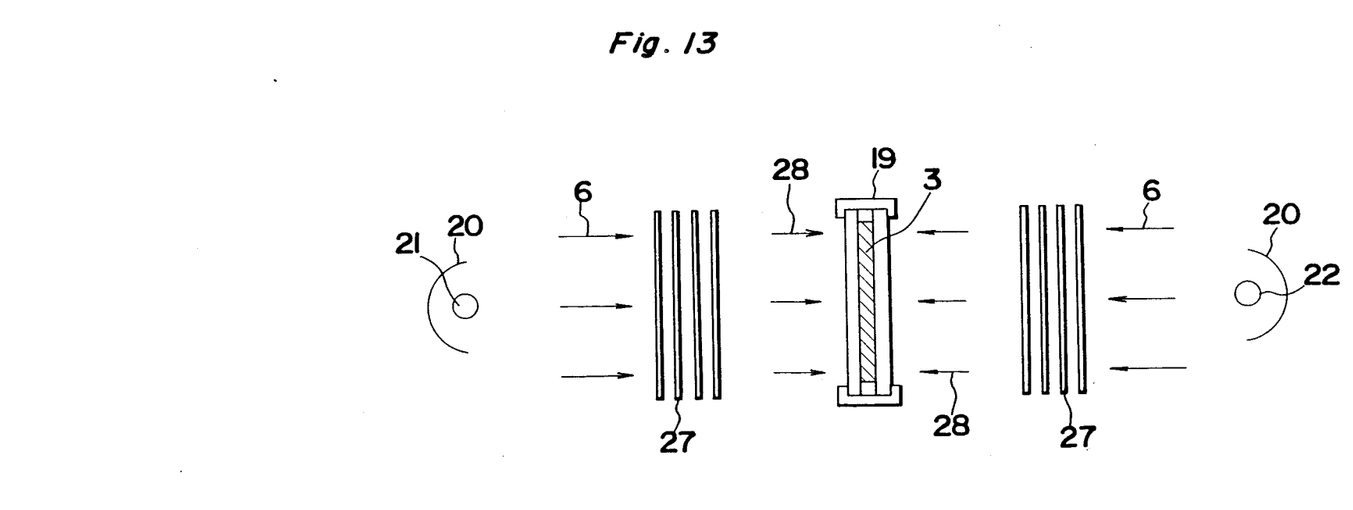

In this example, an apparatus shown in FIG. 13 was used, wherein a pair of ultraviolet lamps were fixed at the same predetermined distances from the mold 19, and several extinction plates 27 were provided with between the mold 19 and each lamp 21 or 22 to reduce illumination of ultraviolet light.

In the first step, the monomer composition 3 was irradiated by ultraviolet light 28 intensity of which was decreased by the extinction plates 27. After the composition was irradiated one or more times, one of the extinction plates was removed to increase the intensity of ultraviolet light which reached the monomer composition so that the deeper layer of the composition was cured. By repeating these procedures, the entire monomer composition was cured to form a transparent plastic plate.

The extinction plate may be colored to limit a wavelength band to be irradiated on the monomer composition.

The movement of the ultraviolet lamps as in Example 5 and the provision of the extinction plates as in Example 6 may be combined.

Example 7

Figure 14A:
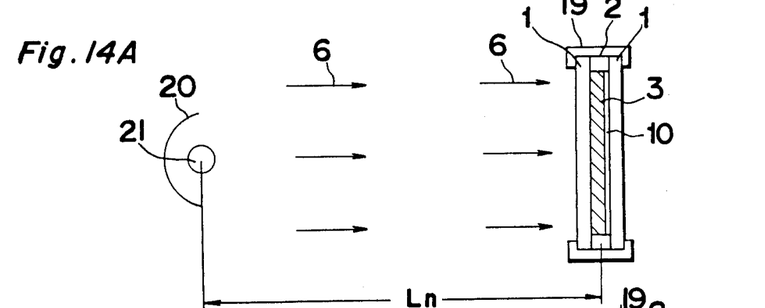
Figure 14B:
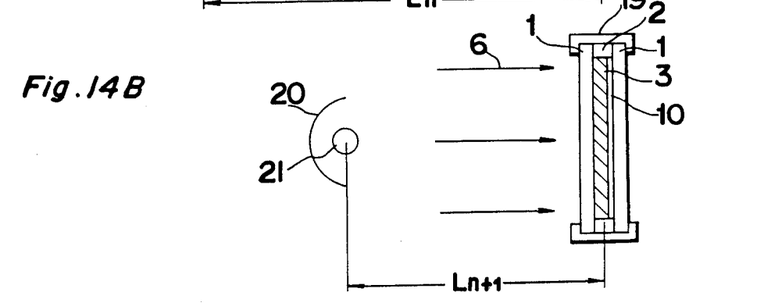

In the same manner as in Example 5 except that a stamper 10 was provided on one of the quartz glass plates 1 and ultraviolet light was irradiated through the other quartz glass plate with changing a distance between the ultraviolet lamp and the mold as shown in FIGS. 14A and 14B, a plastic article was produced.

In this example, as an ultraviolet light source, an extra-high pressure mercury lamp (Jet Light JL-3300 manufactured by Oak Seisakusho. 3 KW) was used and moved so that ultraviolet illumination varied from 1 to 100 mW/cm².

Birefringence and shrinkage rates of the articles produced in Examples 5, 6 and 7 are shown in Table 2.

TABLE 2

| Example No | Birefringence (nm)*1 | | | | Shrinkage factor (%) |
|---|---|---|---|---|---|
| | Center | Middle | Periphery | Average | |
| 5 | 1.6 | 1.8 | 2.5 | 2.0 | 0.3 |
| 6 | 2.0 | 2.8 | 2.5 | 2.4 | 0.6 |
| 7 | 3.6 | 4.2 | 5.1 | 4.3 | 0.7 |

Note: *1 See Note *1 of TABLE 1.

Example 8

Figure 15A:
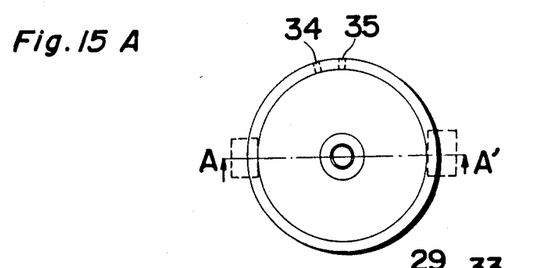
FIG. 15A and 15B show respectively a front view and a cross sectional view of a mold for use in practicing the third method for producing a transparent plastic article according to the present invention.
Figure 15B:
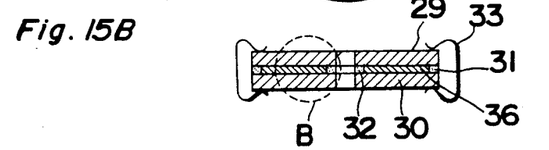

FIGS. 15A and 15 B show a front and vertical cross sectional views of a casting mold, respectively. The mold comprises a pair of glass plates 29, 30 having optical flat surfaces with surface roughness of 0.02 μm or less which are held together by clamps 33 through outer and inner spacers 31 and 32 made of silicone rubber to form a disc shape space between the plates 29 and 30. A monomer composition 36 is injected from an opening 34 and air in the space is exhausted from an opening 35.

The curing procedures in this example will be explained with reference to FIGS. 16A to 16D, which show enlarged view of a part of the mold of FIG. 15B encircled by a circle B. The monomer composition used in this example contained TMPTA and a compound of the formula:

and, as a photosensitizer, IRGACURE 184 (manufactured by Ciba-Geigy).

Figures 16A, 16B, 16C, 16D:
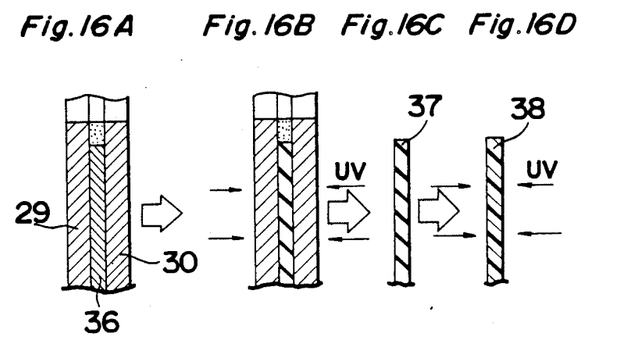
FIGS. 16A, 16B, 16C and 16D show states of the monomer compositon in each steps of the fourth method.

The injected monomer composition 36 of FIG. 16A was irradiated by ultraviolet light and cured to a pre-cure state of FIG. 16B. Then, the composition in the precure state 37 was removed from the mold (FIG. 16C) and further irradiated by ultraviolet light to produce a post-cured transparent plastic article 38 (FIG. 16D).

Heat resistance, birefringence, water absorbance, productivity and appearance of the produced article are shown in Table 3.

Comparative Examples 1–4

In Comparative Examples 1 and 2, a transparent plastic article was produced by injection molding from PC and PMMA, respectively. In Comparative Examples 3 and 4, a transparent plastic article was produced by thermally polymerizing CR-39 (manufactured by UCC) and an epoxy composition containing Epikote 828 (an epoxy resin manufactured by Yuka-Shell Epoxy), HHPA (hexahydrophthalic anhydride manufactured by Shin-Nippon Rika) and IRGACURE 184 as a photosensitizer. Heat resistance, birefringence, water absorbance, productivity and appearance of the produced articles are shown in Table 3. T,270

Example 9

Figure 17:
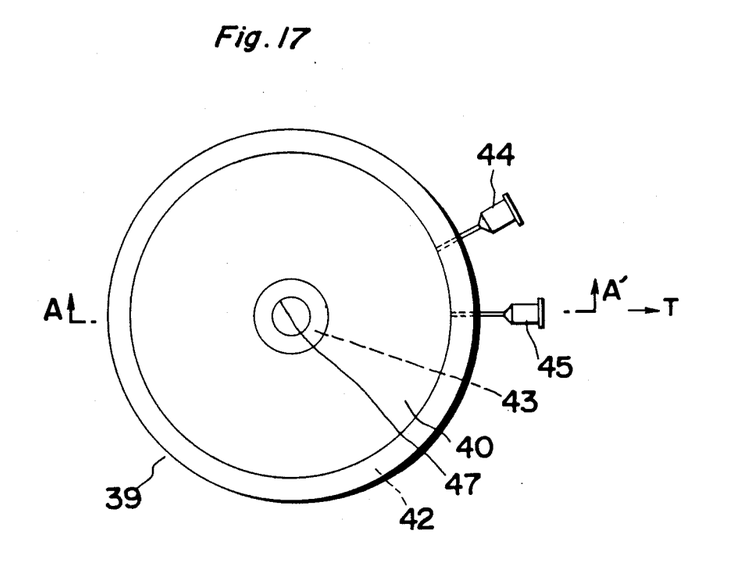
FIG. 17 and FIG. 18 show respectively a front view and a cross sectional view of a mold for use in practicing the fourth method for producing a transparent plastic article according to the present invention.
Figure 18:
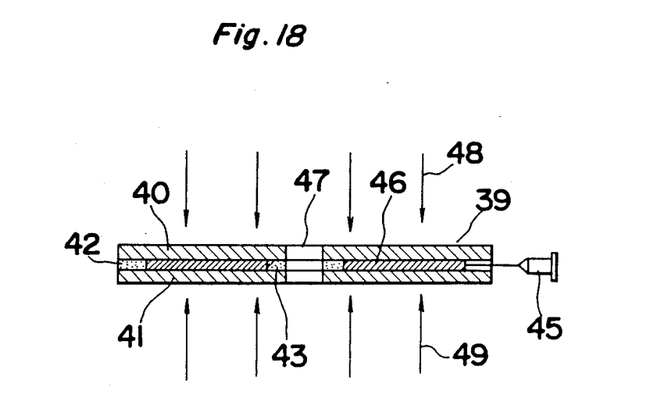

In this example, a mold shown in FIGS. 17 and 18 were used for low strain polymerization according to the present invention. The mold 39 comprises upper and lower quartz glass plates 40 and 41 each having an optically flat finished inner surface and peripheral and central doughnutshaped spacers 42 and 42 made of a silicone rubber having Shore A hardness of 30–100. The glass plates are clamped by means of a matched axis pore 47.

A monomer composition comprising methyl methacrylate (?) was injected from an opening 44 with holding said opening upwardly till the composition overflew from an opening 45.

The monomer composition was precured by application of heat or irradiation of ultraviolet light through both glass plates. The polymerization was stopped when the cured composition was about to separate from the inner surfaces of the glass plates and the clamp was detached. Then, the precured composition was removed from the mold and completely cured by application of heat or irradiation of ultraviolet light in an atmosphere of inert gas such as helium.

Preferably, the spacers have thickness of 5 mm or more so as to follow shrinkage of the composition during curing. In case of silicone rubber, it has preferably Shore A hardness of not more than 100, preferably not more than 70. When the spacer has Shore A hardness more than 100, it shows less deformation in a rubbery elastomeric region. Therefore, when the monomer is cured to such extent that it can be removed from the mold, it is partly released from the mold wall so that a boundary line between the released part and the unreleased area generates a flow mark. If the spacer has Shore A hardness more than 100, its thickness should be 2 or 3 mm. As a spacer material which does not inhibit radical polymerization, urethane rubber, ethylene/vinyl acetate (EVA) polymers and the like are preferred although they have some drawbacks that, after repeated use, urethane rubber tends to adhere to the acrylic material and EVA tends to be deformed. Nevertheless, the spacer made of an elastomer such as urethane rubber and neoprene and a viscoelastically deformable material such as EVA is effective in preventing formation of flow mark and in low strain polymerization according to the present invention.

Figure 19:
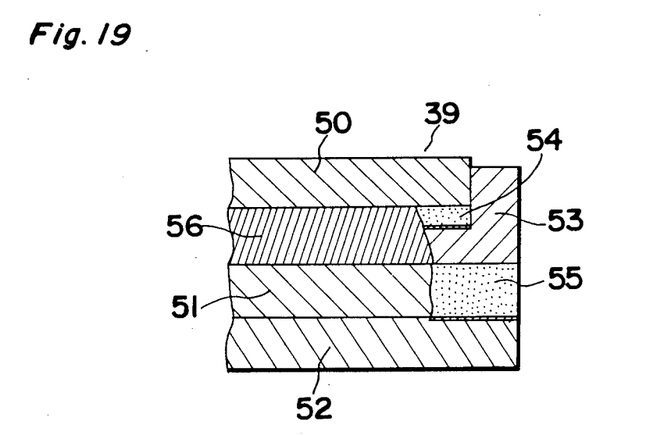
FIG. 19 shows a partial sectional view of another mold for use in practicing the fourth method according to the present invention.

FIG. 19 shows a cross sectional view of a part of a repeatedly usable spacer made of metal. The mold 39 comprises upper and lower glass 50, 51, a glass supporting member 52, a metal spacer 53, a flexible packing 54 which is baked or adhered onto the metal spacer and a flexible relaxation member 55. As the monomer composition 56 is cured, the glass plate 50 follows shrinkage of the composition because of the flexible packing 54 and the flexible relaxation member 55 elastically or viscoelastically deforms. According to this design of the mold, since a volume of the flexible packing is rather small, an unreacted state of the composition near the periphery of the disc substrate can be avoided.

When MMA is used as a monomer, the conventional disc substrate has birefringence of 10 to 20 nm at 810 nm by single pass while a disc substrate made by means of the mold of FIG. 19 had birefringence less than 5 nm.

What is claimed is:
1. A method for producing a transparent plastic article, which comprises the steps of
    (1) charging a photopolymerizable liquid monomer into a mold transparent to ultraviolet light,
    (2) shielding a portion of the monomer by a shielding plate and irradiating the unshielded portion of the monomer with ultraviolet light to form, in said unshielded portion, a polymerized resin part, a gel state part comprising the unreacted monomer and the polymerized resin and a part of the unreacted monomer,
    (3) flowing the gel and/or the unreacted monomer into a cavity formed in the mold by cure shrinkage of the monomer,
    (4) shielding the already polymerized portion and irradiating a wider area than the area defined by the polymerized part formed in the previous irradiation step, and
    (5) continually repeating the steps (3) and (4) till the polymerized area reaches the predetermined size.
2. A method for producing a transparent plastic article, which comprises the steps of
    (i) charging a photopolymerizable liquid monomer into a mold transparent to ultraviolet light,
    (ii) irradiating the mold containing the monomer with ultraviolet light to form a polymerized resin layer, a gel state layer comprising the unreacted monomer and the polymerized resin and a layer of the unreacted monomer,
    (iii) flowing the gel and/or the unreacted monomer into a cavity formed in the mold by cure shrinkage of the monomer,
    (iv) irradiating the mold containing the partially polymerized monomer with ultraviolet light at an illumination larger than that in the previous irradiation step, said illumination of ultraviolet light being increased in this step by decreasing the distance between the monomer and the ultraviolet light source in comparison with the distance between the ultraviolet light and the monomer employed in the previous irradiation step (ii), and
    (v) continuously repeating the steps of (iii) and (iv) till the whole monomer is polymerized.
3. A method for producing a transparent plastic article, which comprises the steps of
    (i) charging a photopolymerizable liquid monomer into a mold transparent to ultraviolet light,
    (ii) irradiating the mold containing the monomer with ultraviolet light to form a polymerized resin layer, a gel state layer comprising the unreacted monomer and the polymerized resin and a layer of the unreacted monomer, said irradiation being carried out by providing plural extinction plates between the monomer and the ultraviolet light source,
    (iii) flowing the gel and/or the unreacted monomer into a cavity formed in the mold by cure shrinkage of the monomer,
    (iv) irradiating the mold containing the partially polymerized monomer with ultraviolet light at an illumination larger than that in the previous irradiation step, said irradiation being carried out by removing the extinction plates used in step (ii), one by one,
    (v) continuously repeating the steps of (iii) and (iv) till the whole monomer is polymerized.

* * * * *